(12) United States Patent
Lee et al.

(10) Patent No.: US 6,833,897 B2
(45) Date of Patent: Dec. 21, 2004

(54) IPS-LCD DEVICE WITH A COLOR FILTER FORMED ON AN ARRAY SUBSTRATE

(75) Inventors: Seok Lyul Lee, Taoyuan Hsien (TW); Sakae Tanaka, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/127,012

(22) Filed: Apr. 19, 2002

(65) Prior Publication Data

US 2003/0197825 A1 Oct. 23, 2003

(51) Int. Cl.[7] .............................................. G02F 1/1343
(52) U.S. Cl. ...................................... 349/141; 349/143
(58) Field of Search ................................ 349/141, 143, 349/139, 42–43

(56) References Cited

U.S. PATENT DOCUMENTS 5,745,207 A * 4/1998 Asada et al. ................. 349/141
5,852,485 A * 12/1998 Shimada et al. ............. 349/141
6,177,970 B1 * 1/2001 Kim .............................. 349/43
6,208,399 B1 * 3/2001 Ohta et al. ................... 349/141

* cited by examiner

Primary Examiner—Dung Nguyen
(74) Attorney, Agent, or Firm—Merchant & Gould P.C.

(57) ABSTRACT

An in-plane switching mode liquid crystal display (IPS-LCD) device. The device has a lower glass substrate and an upper glass substrate disposed parallel to each other. A plurality of transverse-extending scanning electrodes and a plurality of lengthwise-extending signal electrodes are patterned on the lower glass substrate to define a plurality of pixel areas. In each pixel area, at least one lengthwise-extending pixel electrode and at least two lengthwise-extending common electrodes are formed on the same level plane of the lower glass substrate, wherein the pixel electrode is disposed at the interval between the common electrodes. Also, a color resin layer is sandwiched between the signal electrodes and the common electrodes. Moreover, the common electrode is located over the signal electrode across two adjacent pixel areas.

20 Claims, 10 Drawing Sheets

IPS-LCD DEVICE WITH A COLOR FILTER FORMED ON AN ARRAY SUBSTRATE

BACKGROUND OF THE INVENTION

1. Field of the Invention

The present invention relates to an In-Plane Switching (IPS) mode liquid crystal display (LCD) device and, more particularly, to an IPS-LCD device with a color filter formed on an array substrate.

2. Description of the Related Art

In a conventional twisted nematic LCD (TN-LCD) device, liquid crystal molecules are twisted between two facing electrodes respectively formed on two substrates, in which an electric field is generated in an approximately vertical direction to the plane of the two substrates. To achieve the aim of wide viewing angle, an in-plane switching mode LCD (IPS-LCD) device has been proposed, in which common electrodes and pixel electrodes are formed on the same substrate (TFT array substrate) and an in-plane electric field therebetween is generated to rearrange the liquid crystal molecules along the in-plane electric field. Accordingly, the IPS-LCD device has been used for improving viewing angle, contrast ratio and color shift.

FIG. 1A is a top view showing a conventional IPS-LCD device. FIG. 1B is a sectional diagram along line A—A shown in FIG. 1A. The IPS-LCD device has an array substrate 10, a color filter (CF) substrate 12, and a liquid crystal layer 14 formed in a gap between the two parallel substrates 10 and 12. On the array substrate 10, a plurality of traverse-extending scanning electrodes 16 and a plurality of lengthwise-extending signal electrodes 18 are arranged in a matrix form to define rectangular-shaped pixel areas 20. Also, in each pixel area 20 a strip-shaped pixel electrode 22 is disposed between two strip-shaped common electrodes 24 which are the branches of a common line 24A, and both of the pixel electrode 22 and the common electrode 24 are parallel to the signal electrodes 18. Moreover, each pixel area 20 has a thin-film transistor (TFT) structure 26 with a drain electrode electrically connected to the pixel electrode 22. When a voltage is applied to electrodes, an in-plane electric field is produced between the pixel electrode 22 and the common electrode 24.

In processing the array substrate 10, the scanning electrodes 16 and the common electrodes 24 are patterned on the same level plane, and then covered by a gate insulating layer 17. Next, the signal electrodes 18 and the pixel electrodes 22 are patterned on the gate insulating layer 17. Thereafter, a first orientation layer 19 is formed to cover the entire surface of the array substrate 10. On the CF substrate 12, a plurality of black matrix layers 13, a color resin layer 15, and a second orientation layer 21 are successively stacked and faced to the liquid crystal layer 14. This black matrix layer 13 is provided so as to hide the TFT structure 26, the scanning electrode 16, the signal electrode 18, and the like with respect to the external field of this TFT structure 26.

However, in the above structure, the common electrodes 24 and the pixel electrodes 22 are opaque to result in a low transmittance. Also, the common electrodes 24 adjacent to the signal electrode 18, serving as shielding electrodes, are required to avoid a lateral field between the pixel electrode 22 and the signal electrode 18. Therefore, in the area I, an aperature ratio is less than desired. Furthermore, in the area II, since a short by coupling the common line 24A and the scanning electrode 16 in the manufacturing process is often generated, the yield is reduced.

SUMMARY OF THE INVENTION

The present invention is an IPS-LCD device having a color filter on the array substrate and a common electrode overlapping the signal electrode to solve the above-mentioned problems.

The in-plane switching mode liquid crystal display (IPS-LCD) device has a lower glass substrate and an upper glass substrate disposed parallel to each other. A plurality of transverse-extending scanning electrodes and a plurality of lengthwise-extending signal electrodes are patterned on the lower glass substrate to define a plurality of pixel areas. In each pixel area, at least a lengthwise-extending pixel electrode and at least two lengthwise-extending common electrodes are formed on the same level plane of the lower glass substrate, wherein the pixel electrode is disposed at the interval between the common electrodes. Also, a color resin layer is sandwiched between the signal electrodes and the common electrodes. Moreover, the common electrode is located over the signal electrode across two adjacent pixel areas.

Accordingly, it is a principle object of the invention to provide the color filter on the array substrate.

It is another object of the invention to avoid a lateral field generated between the signal electrode and the pixel electrode.

Yet another object of the invention is to prevent light leakage between the signal electrode and the common electrode.

It is a further object of the invention to achieve a high aperture ration in the IPS-LCD device.

Still another object of the invention is to reduce the coupling between the common electrode and the scanning electrode.

Another object of the invention is to avoid electron charges remaining on the electrodes so as to prevent the image-sticking problem.

It is an object of the invention to increase the yield.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

[First Embodiment]

Figure 1A:
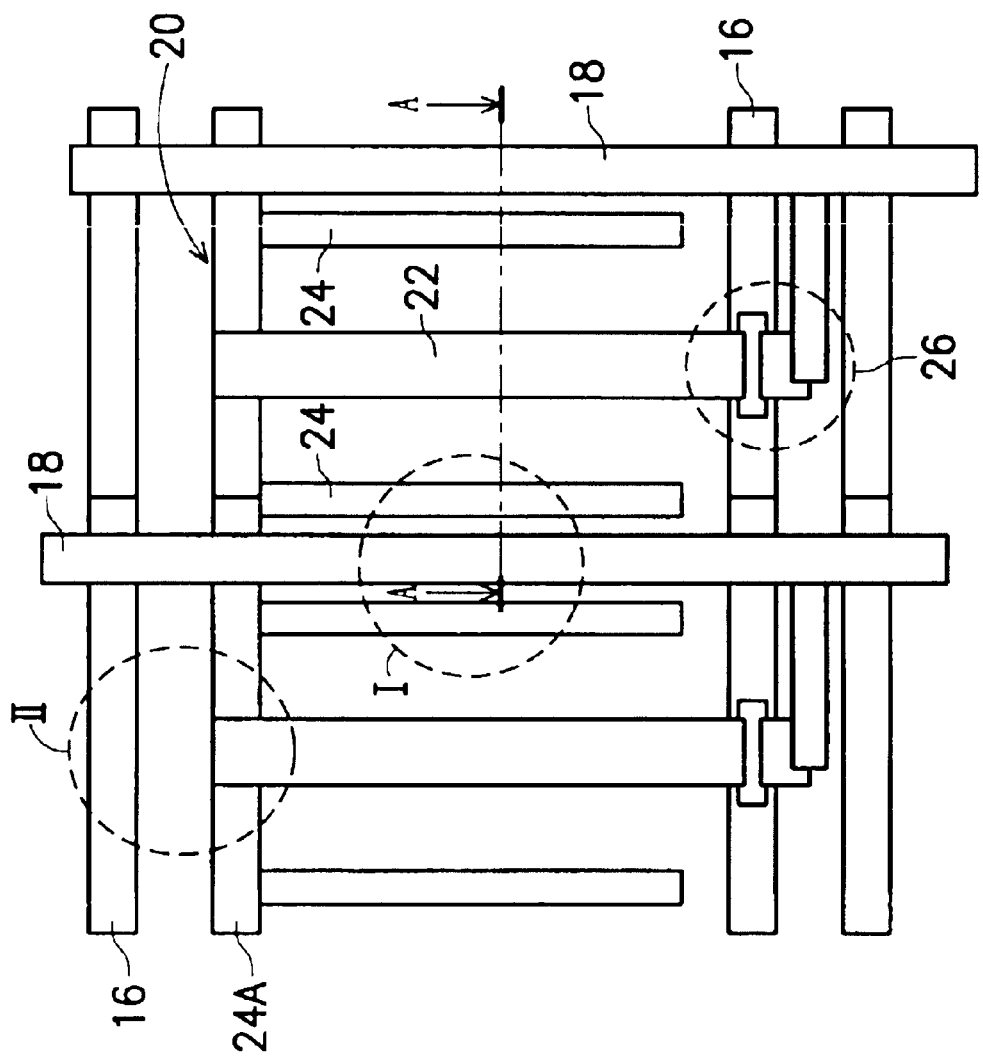
FIG. 1A is a top view showing a conventional IPS-LCD device.
Figure 1B:
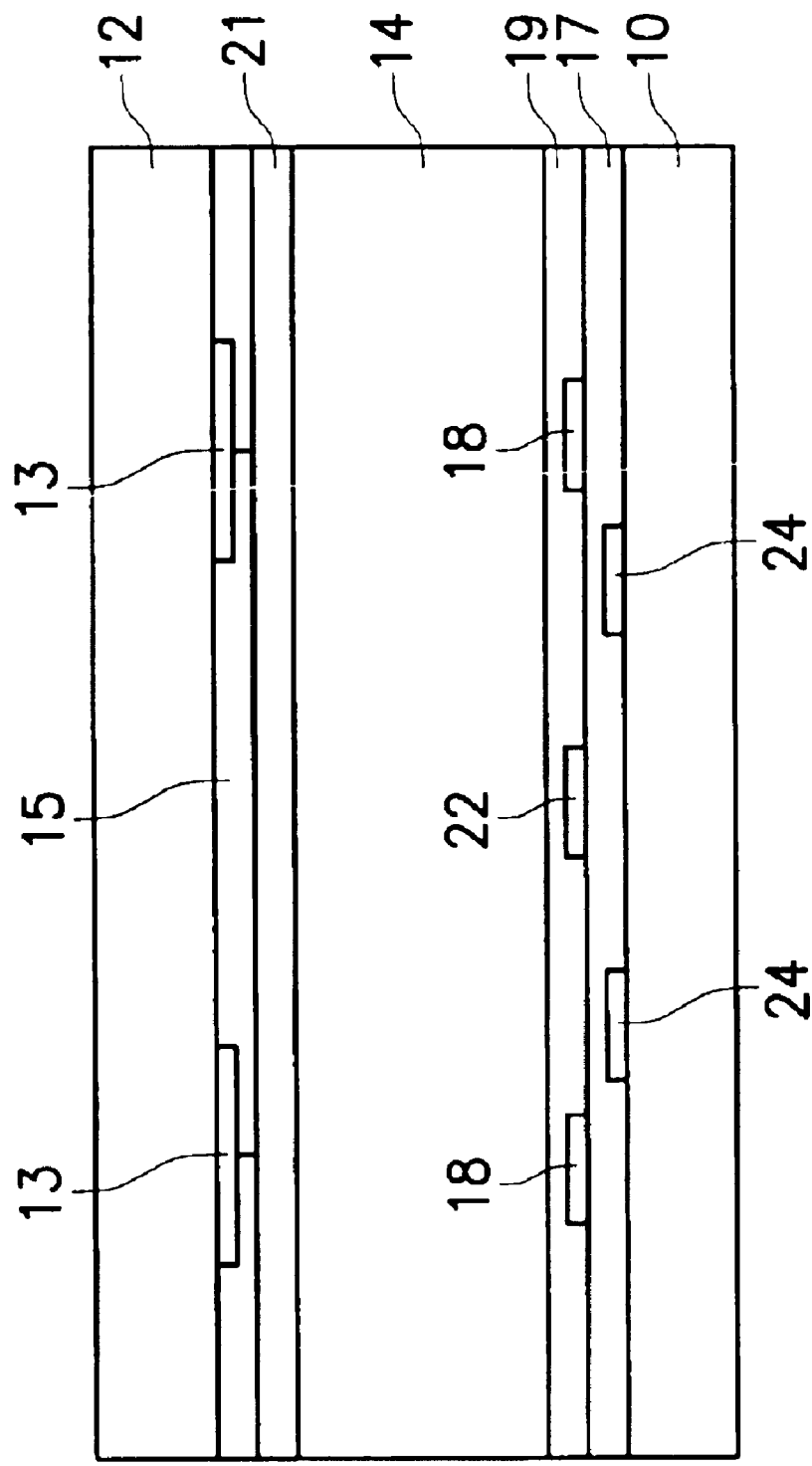
FIG. 1B is a sectional diagram along line A—A shown in FIG. 1A.
Figure 2A:
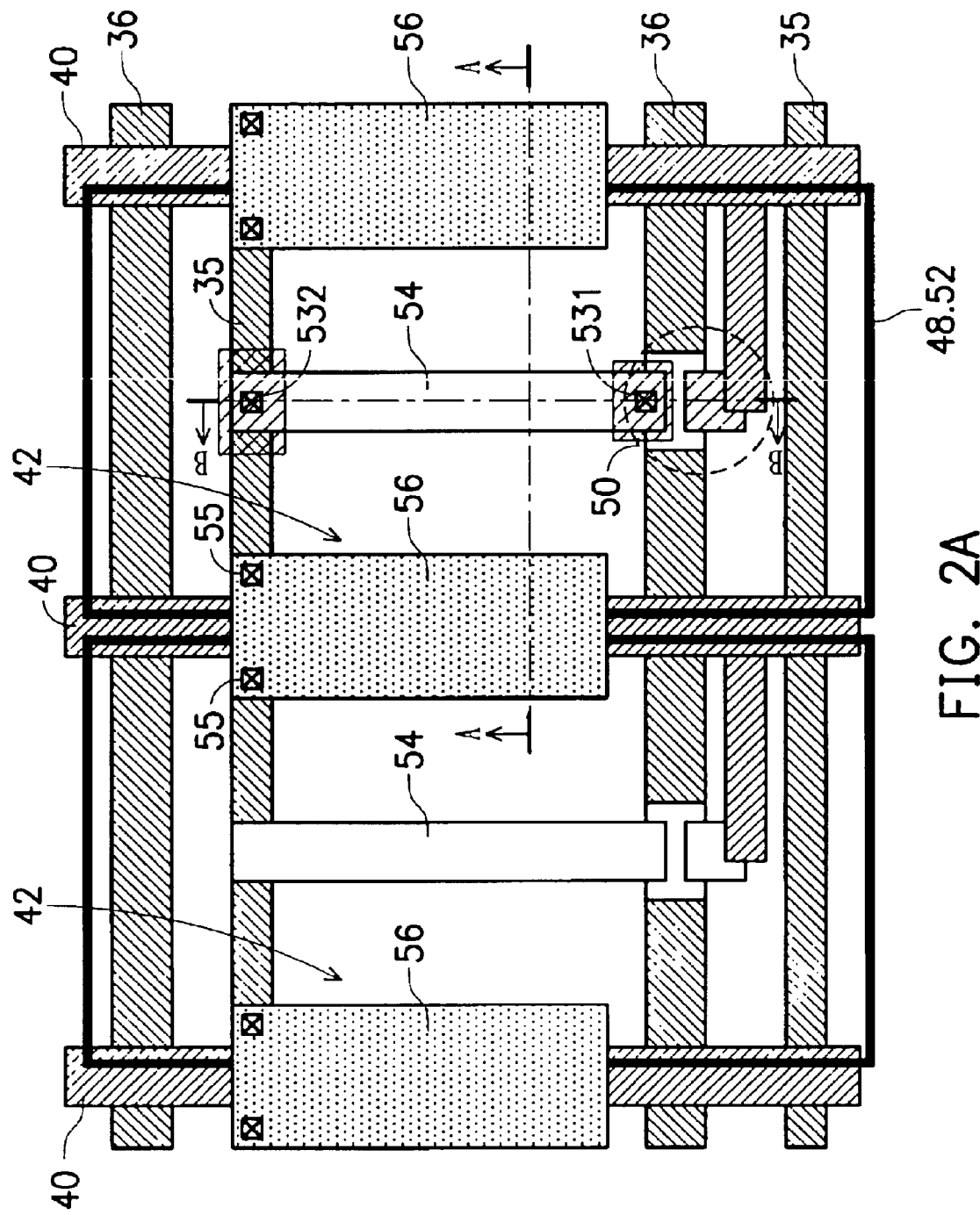
FIG. 2A is a top view showing an IPS-LCD device according to the first embodiment of the present invention.
Figure 2B:
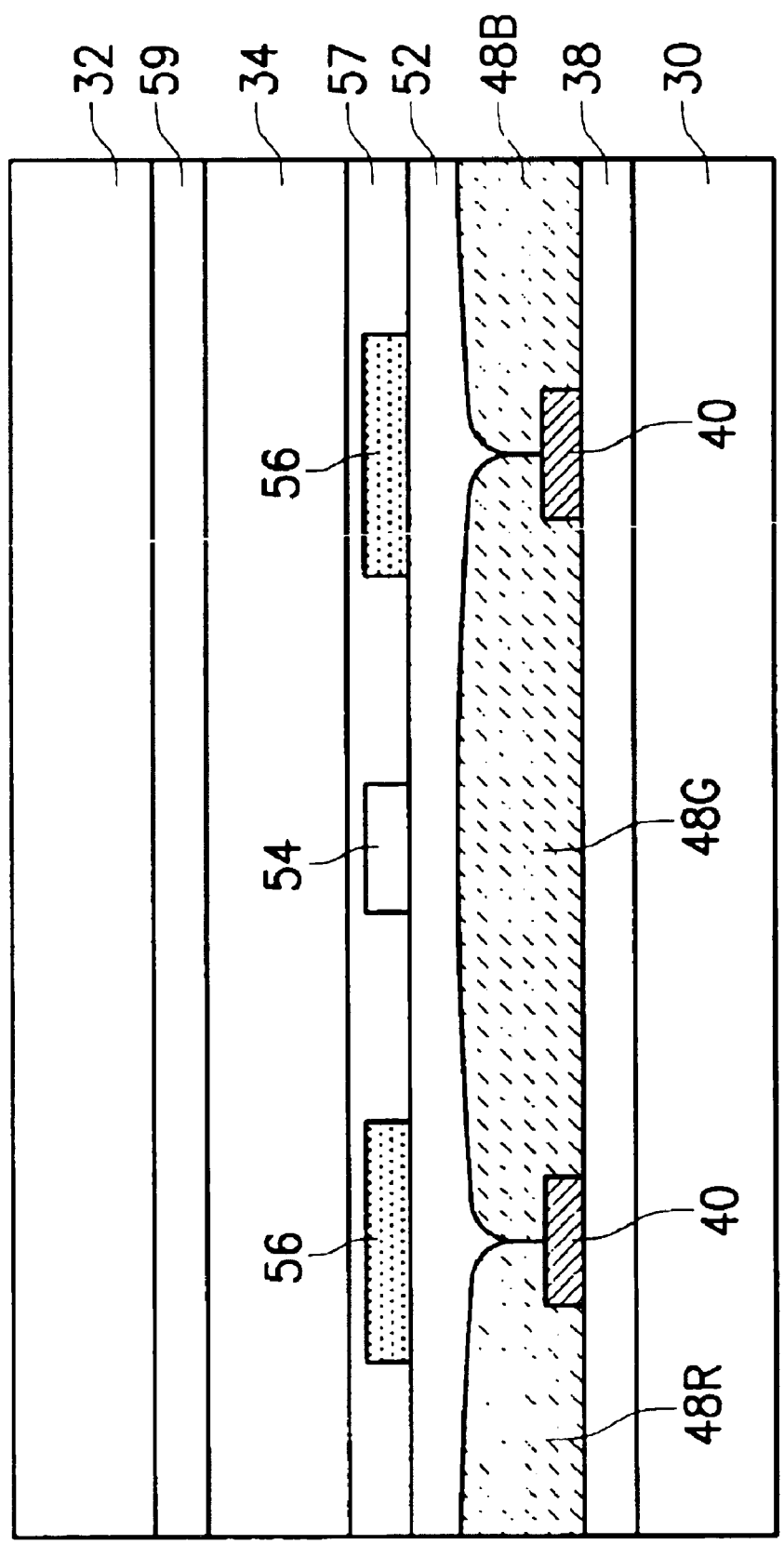
FIG. 2B is a sectional diagram along line A—A shown in FIG. 2A.
Figure 2C:
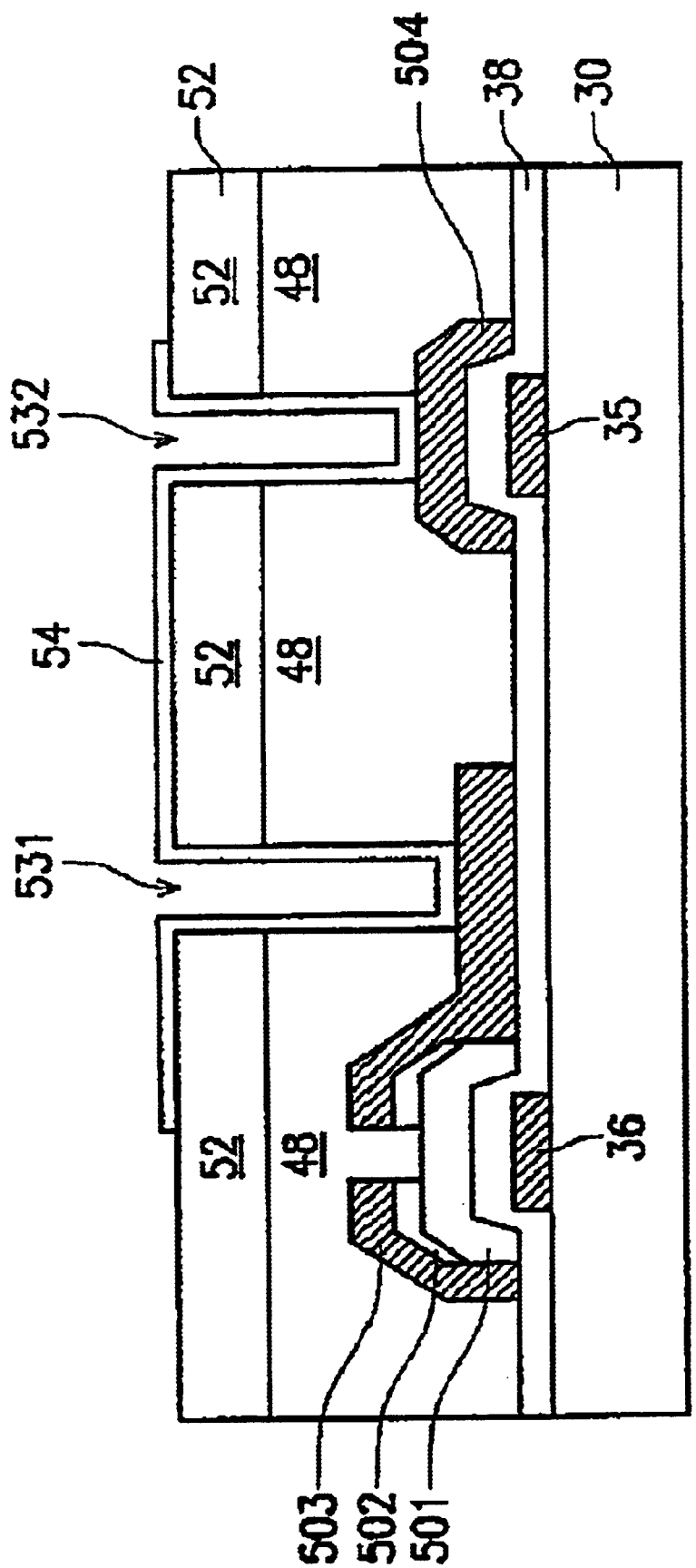
FIG. 2C is a sectional diagram along line B—B shown in FIG. 2A.

FIG. 2A is a top view showing an IPS-LCD device according to the first embodiment of the present invention. FIG. 2B is a sectional diagram along line A—A shown in FIG. 2A. FIG. 2C is a sectional diagram along line B—B shown in FIG. 2A.

The IPS-LCD device has a lower glass substrate 30, an upper glass substrate 32, and a liquid crystal layer 34 formed in a gap between the two parallel substrates 30 and 32. The lower glass substrate 30 serves as an array substrate with a TFT array, electrodes, and a color filter. On the lower glass substrate 30, a plurality of transverse-extending scanning electrodes 36 and a plurality of transverse-extending common lines 35 are patterned on the same level plane, and then covered by a gate insulating layer 38. Next, a plurality of lengthwise-extending signal electrodes 40 are patterned on the gate insulating layer 38, thus the scanning electrodes 36 and the signal electrodes 40 are arranged in a matrix form to define rectangular-shaped pixel areas 42. Also, depending on well-known technologies, a TFT structure 50 comprising an amorphous silicon channel 501, a source/drain diffusion region 502 and a source/drain electrode 503 can be formed on a predetermined area of the scanning electrode 36 within each pixel area 42, in which the source electrode is electrically connected to the extending portion of the signal electrode 40. In addition, an upper electrode 504 of a capacitor is formed over a predetermined area of the common line 35.

Next, a color resin layer 48, serving as a color filter, is formed. Preferably, a Red resin layer 48R, a Blue resin layer 48B or a Green resin layer 48G are respectively formed in three pixel areas 42. Then, an organic insulator 52 is formed on the color resin layer 48. Thereafter, a plurality of strip-shaped pixel electrode 54 and a plurality of strip-shaped common electrodes 56 are patterned on the organic insulator 52 and in parallel to the signal electrodes 40. Finally, a first orientation layer 57 is formed on the entire surface of the lower glass substrate 30, and a second orientation layer 59 is formed on the upper glass substrate 32 to face the liquid crystal layer 34.

In each pixel area 42, one pixel electrode 54 is disposed between two common electrodes 56 to form two sub-pixel ureas. When a voltage is applied to electrodes, an in-plane electric field is produced between the pixel electrode 54 and the common electrode 56. One end of the pixel electrode 54 is electrically connected to the drain electrode of the TFT structure 50 through a first via hole 531, and the other end of the pixel electrode 54 may overlap part of the upper electrode 504 and be electrically connected the upper electrode 504 through a second via hole 532, thus providing a capacitor. The common electrode 56 of a wider width is located on the signal electrode 40 of a narrower width across two adjacent pixel areas 42, and electrically connected to the common line 35 through a third via hole 55 within each pixel area 42. Preferably, the organic insulator 52 of more than 1 μm and the color resin layer 48 or more than 1 μm have a photo-sensitive characteristic and a dielectric constant less than 4.

It is noted that each of the common electrodes 56 is located over the signal electrode 40, and the pixel electrode 54 and the signal electrode 40 are formed on different level planes. Therefore, a lateral field generated between the signal electrode 40 and the pixel electrode 54 is avoided, and light leakage between the signal electrode 40 and the common electrode 56 is prevented. Also, there is no need to form the black matrix layer used in conventional IPS-LCD device to prevent light leakage between the signal electrode 40 and the common electrode 56, thus a high aperture ratio is achieved in the first embodiment of the IPS-LCD device. Furthermore, since the organic insulator 52 and the color resin layer 48 are interposed between the common electrode 56 and the signal electrode 40, the coupling between the common electrode 56 and the scanning electrode 40 is reduced. Moreover, the pixel electrode 54 and the common electrode 56 are formed on the same level plane, and there is no any organic insulator over the pixel electrode 54 and the common electrode 56 except the orientation layer 57. This avoids electron charges remaining on the electrodes 54 and therefore prevents the image-sticking problem.

Figure 3A:
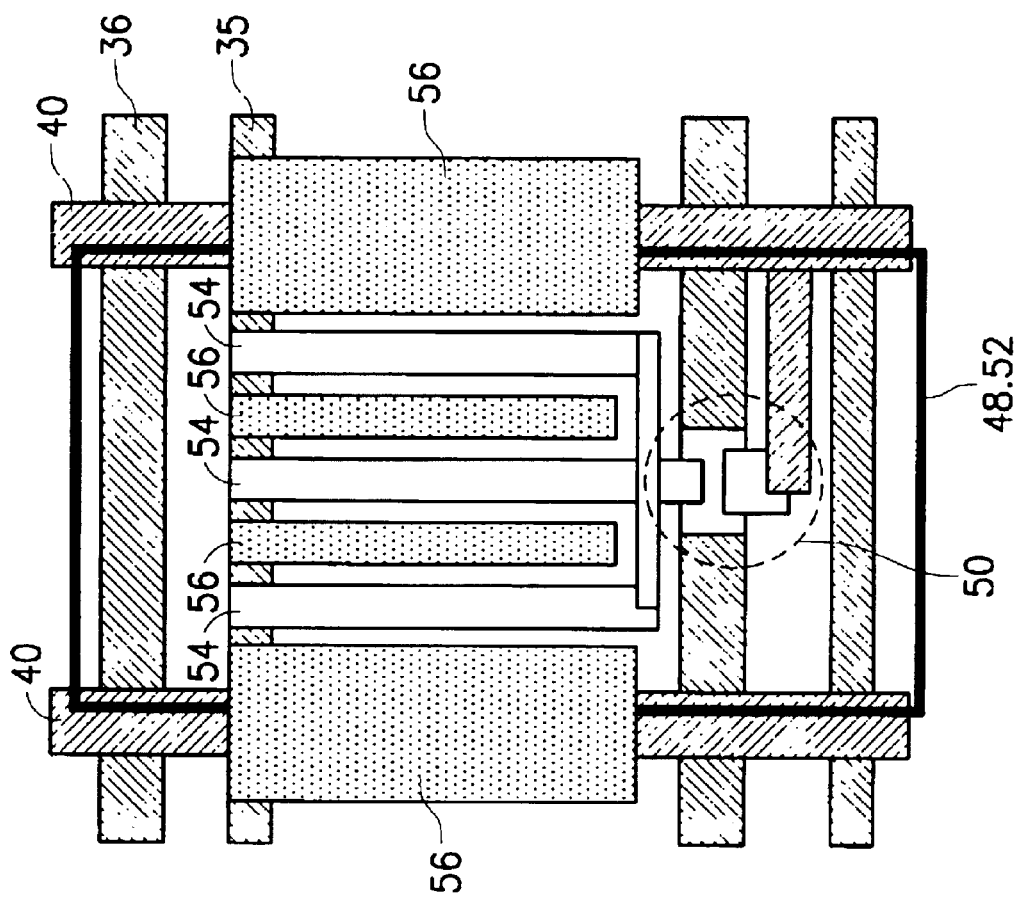
FIG. 3A is a top view showing the IPS-LCD device with comb-shaped pixel electrodes according to the first embodiment of the present invention.
Figure 3B:
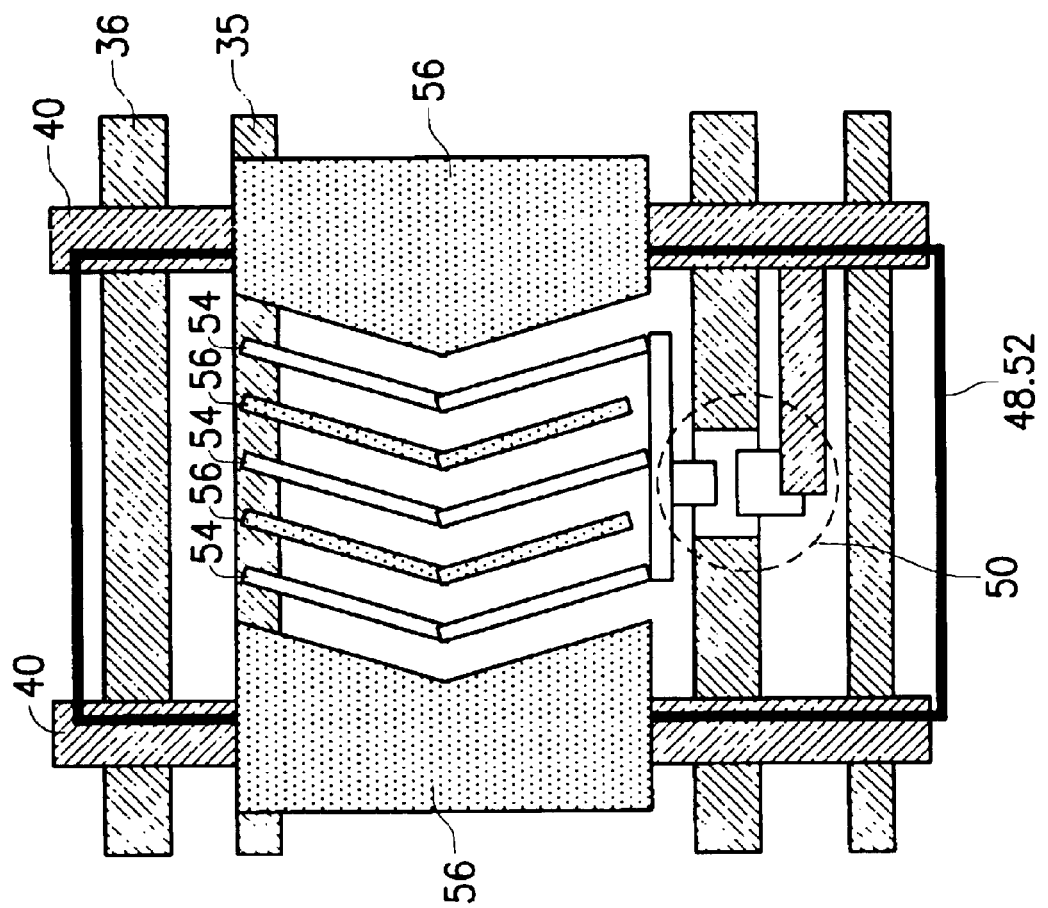
FIG. 3B is a top view showing the IPS-LCD device with herringbone-shaped pixel electrodes according to the first embodiment of the present invention.

FIGS. 3A and 3B are top views showing the IPS-LCD device with more than one pixel electrode according to the first embodiment of the present invention. As shown in FIG. 3A, in the pixel area 42, a comb-shaped pixel electrode structure has three teeth 54 arranged at intervals between the four strip-shaped common electrodes 56, thus forming six sub-pixel areas. As shown in FIG. 3B, in the pixel area 42, both the pixel electrodes 54 and the common electrodes 56 have a herringbone-shaped profile which can lead to a specific tilted degree of the in-plane electric field which corresponds to the rotation angle of the major axes of the liquid crystal molecules to solve the coloring phenomenon. In other cases, the electrodes 54 and 56 can be formed in a zig-zag profile, or one of the electrodes 54 and 56 can be rotated 5~30° from axes of the adjacent electrodes.

[Second Embodiment]

Figure 4A:
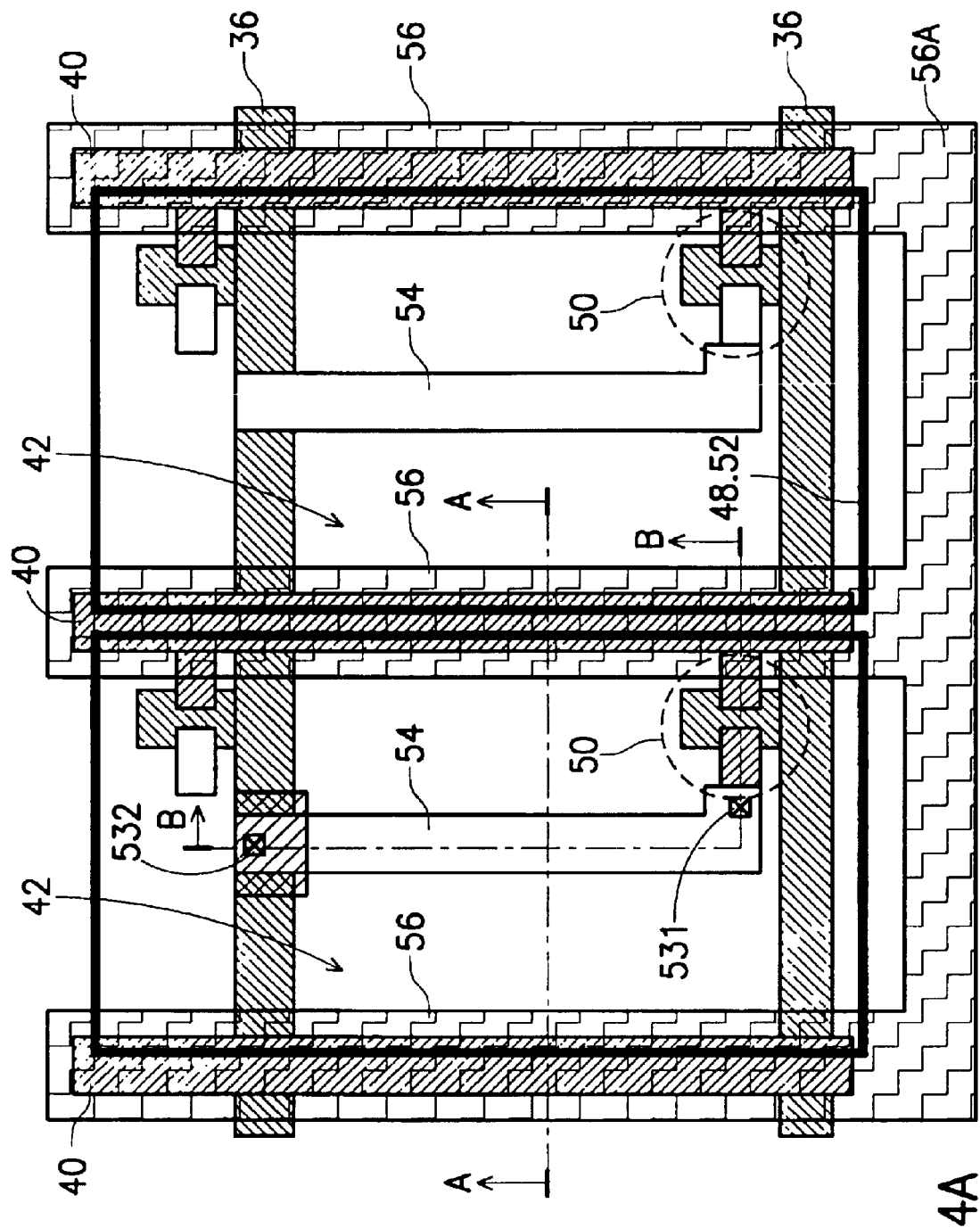
FIG. 4A is a top view showing an IPS-LCD device according to the second embodiment of the present invention.
Figure 4B:
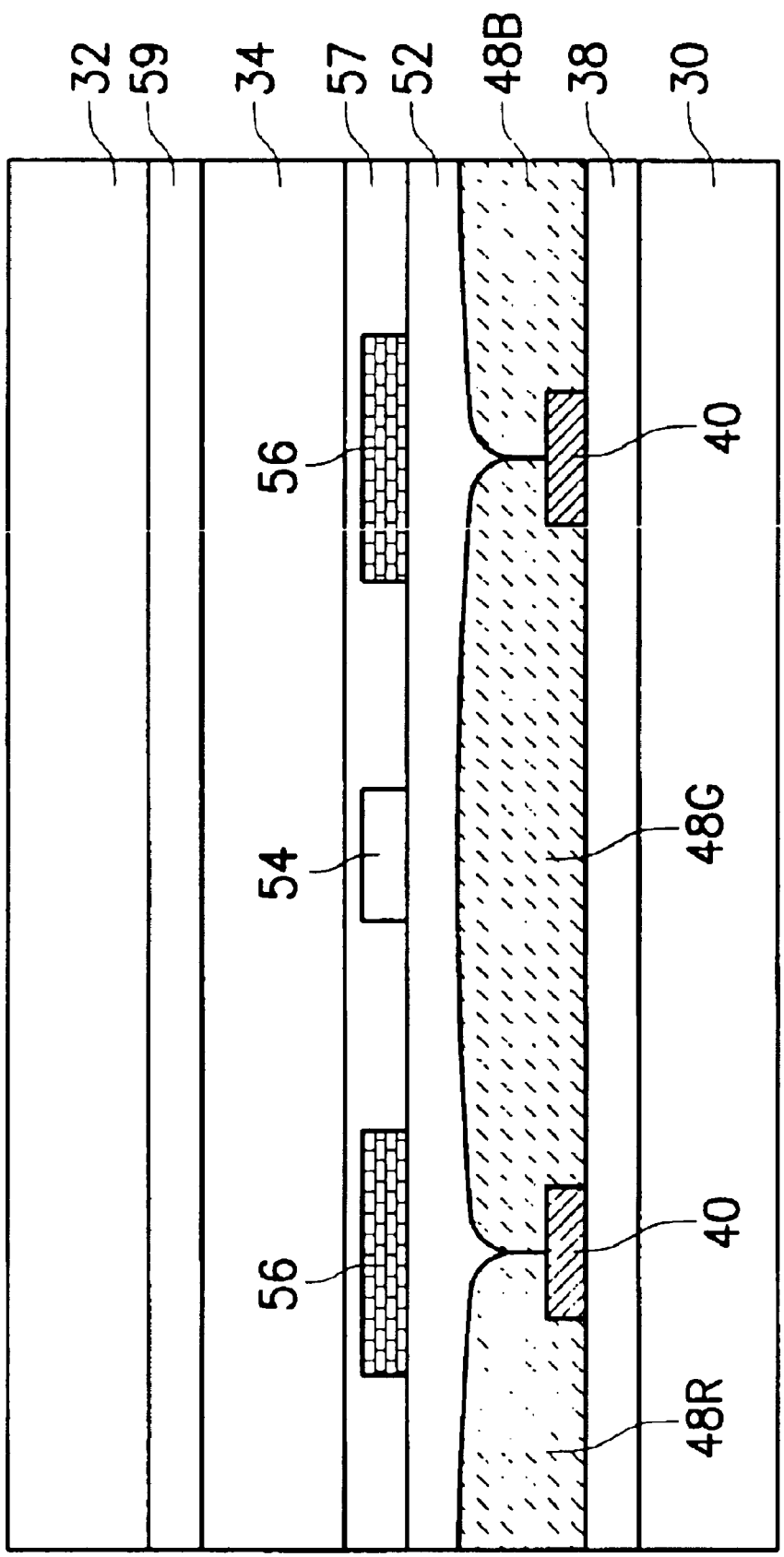
FIG. 4B is a sectional diagram along line A—A shown in FIG. 4A.
Figure 4C:
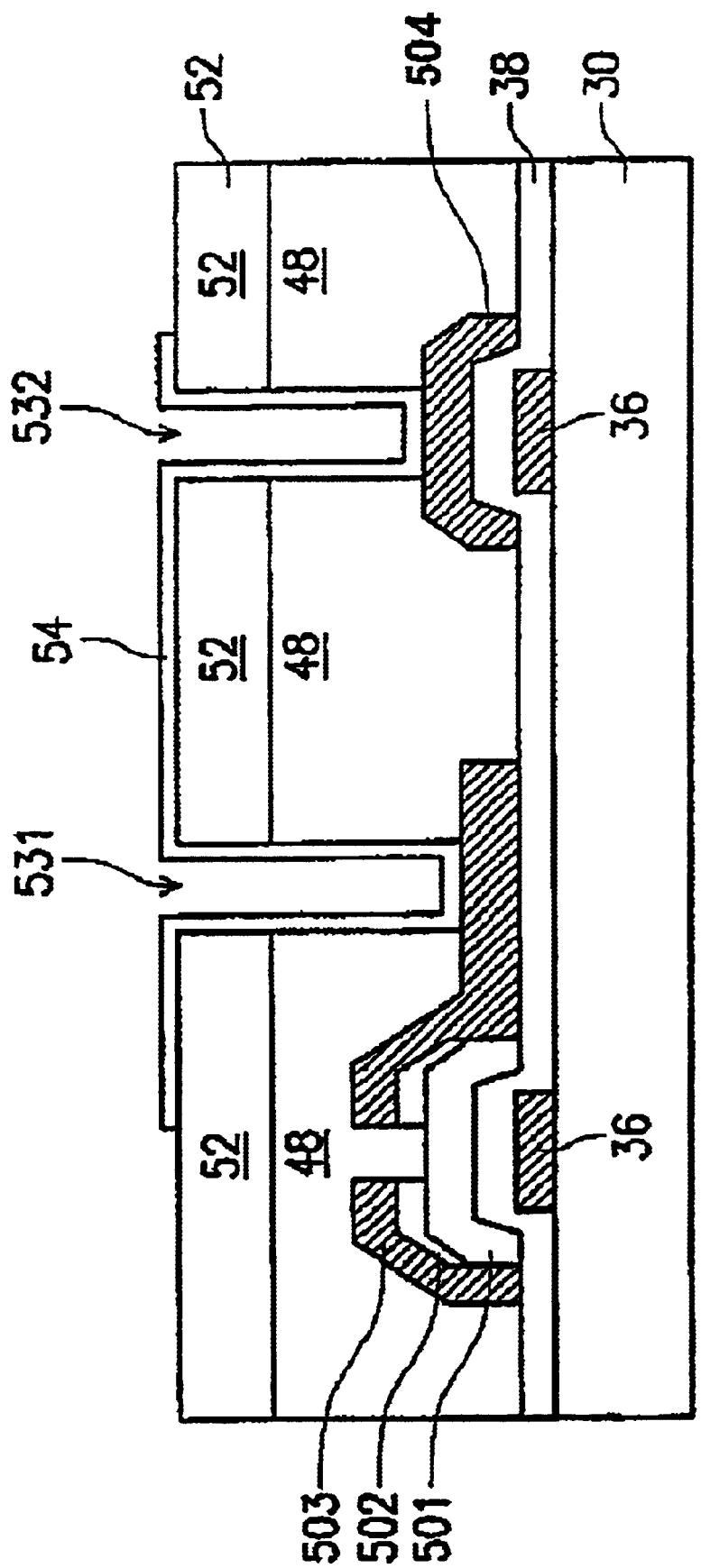
FIG. 4C is a sectional diagram along line B—B shown in FIG. 4A.

For modifying the electrode structure in the first embodiment, in the second embodiment, the common line and the scanning electrode are formed on different planes and the common line is outside the active area of the array substrate. FIG. 4A is a top view showing an IPS-LCD device according to the second embodiment of the present invention. FIG. 4B is a sectional diagram along line A—A shown in FIG. 4A. FIG. 4C is a sectional diagram along line B—B shown in FIG. 4A.

The elements and process are the same as the above description in the first embodiment except for the common lines 35. In the second embodiment, the step of forming the common lines 35 on the lower glass substrate 30 is omitted during patterning of the scanning electrodes 36. When patterning the common electrodes 56 on the organic insulator 52, a transverse-extending common line 56A is patterned outside all pixel areas 42 of the array substrate 30, thus all of the common electrodes 56 are electrically connected to the common line 56A on the same level plane. This avoids a short by coupling the common line 56A and the scanning electrode 36 in the manufacturing process so as to increase the yield of the IPS-LCD device.

It is to be understood that the present invention is not limited to the embodiments described above, but encompasses any and all embodiments within the scope of the following claims.

What is claimed is:

1. An in-plane switching mode liquid crystal display (IPS-LCD) device, comprising:
   a lower glass substrate and an upper glass substrate disposed parallel to each other;
   a plurality of transverse-extending scanning electrode; and a plurality of lengthwise-extending signal electrodes patterned on the lower glass substrate to define a plurality of pixel areas;

at least a lengthwise-extending pixel electrode and at least two lengthwise-extending common electrodes formed within each pixel area on the same level plane of the lower glass substrate, wherein the pixel electrode is disposed at the interval between the common electrodes; and a color resin layer sandwiched between the signal electrodes and the common electrodes;

wherein the common electrode is located over part of the signal electrode, across two adjacent pixel areas and between two adjacent scanning electrodes.

2. The IPS-LCD device according to claim 1, further comprising a liquid crystal layer interposed between the lower glass substrate and the upper glass substrate.

3. The IPS-LCD device according to claim 1, further comprising the TFT structure in each pixel area.

4. The IPS-LCD device according to claim 3, wherein the TFT structure comprises a drain electrode which is electrically connected to the pixel electrode through a first via hole.

5. The ISP-LCD device according to claim 1, further comprising a plurality of transverse-extending common lines patterned on the same level plane with the scanning electrodes.

6. The IPS-LCD device according to claim 5, wherein the common electrode in each pixel area is electrically connected to the common line through a second via hole.

7. The IPS-LCD device according to claim 1, further comprising a transverse-extending common line patterned on the same level plane with the common electrodes and outside all pixel areas.

8. The IPS-LCD device according to claim 7, wherein all of the common electrodes on the lower glass substrate are electrically connected to the common line.

9. The IPS-LCD device according to claim 1, further comprising an organic insulator formed on the color resin layer, thereby patterning the common electrodes and the pixel electrodes on the organic insulator.

10. The IPS-LCD device according to claim 9, wherein the organic insulator and the color resin layer have a photo-sensitive characteristic and a dielectric constant less than 4.

11. The IPS-LCD device according to claim 1, further comprising:

a first orientation layer covering the entire surface of the lower glass substrate; and a second orientation layer covering the entire surface of the upper glass substrate.

12. The IPS-LCD device according to claim 1, wherein the pixel electrodes and the common electrodes have a strip-shaped profile.

13. The IPS-LCD device according to claim 1, wherein the pixel electrodes and the common electrodes have a herringbone-shaped profile.

14. An in-plane switching mode liquid crystal display (IPS-LCD) device, comprising:

a lower glass substrate and an upper glass substrate disposed parallel to each other;

a plurality of transverse-extending scanning electrodes and a plurality of lengthwise-extending signal electrodes patterned on the lower glass substrate to define a plurality of pixel areas;

at least a lengthwise-extending pixel electrode and at least two lengthwise-extending common electrodes formed within each pixel area on the same level plane of the lower glass substrate, wherein the pixel electrode is disposed at the interval between the common electrodes;

a plurality of transverse-extending common lines formed on the same level plane with the scanning electrodes, wherein the common electrode in each pixel area is electrically connected to the common line through a first via hole; and a color resin layer sandwiched between the signal electrodes and the common electrodes;

wherein the pixel electrodes and the signal electrodes are formed on different level planes;

wherein the common electrode is a rectangular electrode located over part of the signal electrode, across two adjacent pixel areas and between two adjacent scanning electrodes.

15. The IPS-LCD device according to claim 14, further comprising a liquid crystal layer interposed between the lower glass substrate and the upper glass substrate.

16. The ISP-LCD device according to claim 14, further comprising a TFT structure in each pixel area.

17. The IPS-LCD device according to claim 16, wherein the TFT structure comprises a drain electrode which is electrically connected to the pixel electrode through a second via hole.

18. The IPS-LCD device according to claim 14, further comprising an organic insulator formed on the color resin layer, thereby patterning the common electrodes and the pixel electrodes on the organic insulator.

19. The IPS-LCD device according 18, wherein the organic insulator and the color resin layer have a photo-sensitive characteristic and a dielectric constant less than 4.

20. The IPS-LCD device according to claim 14, further comprising:

a first orientation layer covering the entire surface of the lower glass substrate; and a second orientation layer covering the entire surface of the upper glass substrate.

* * * * *